UNITED STATES PATENT OFFICE.

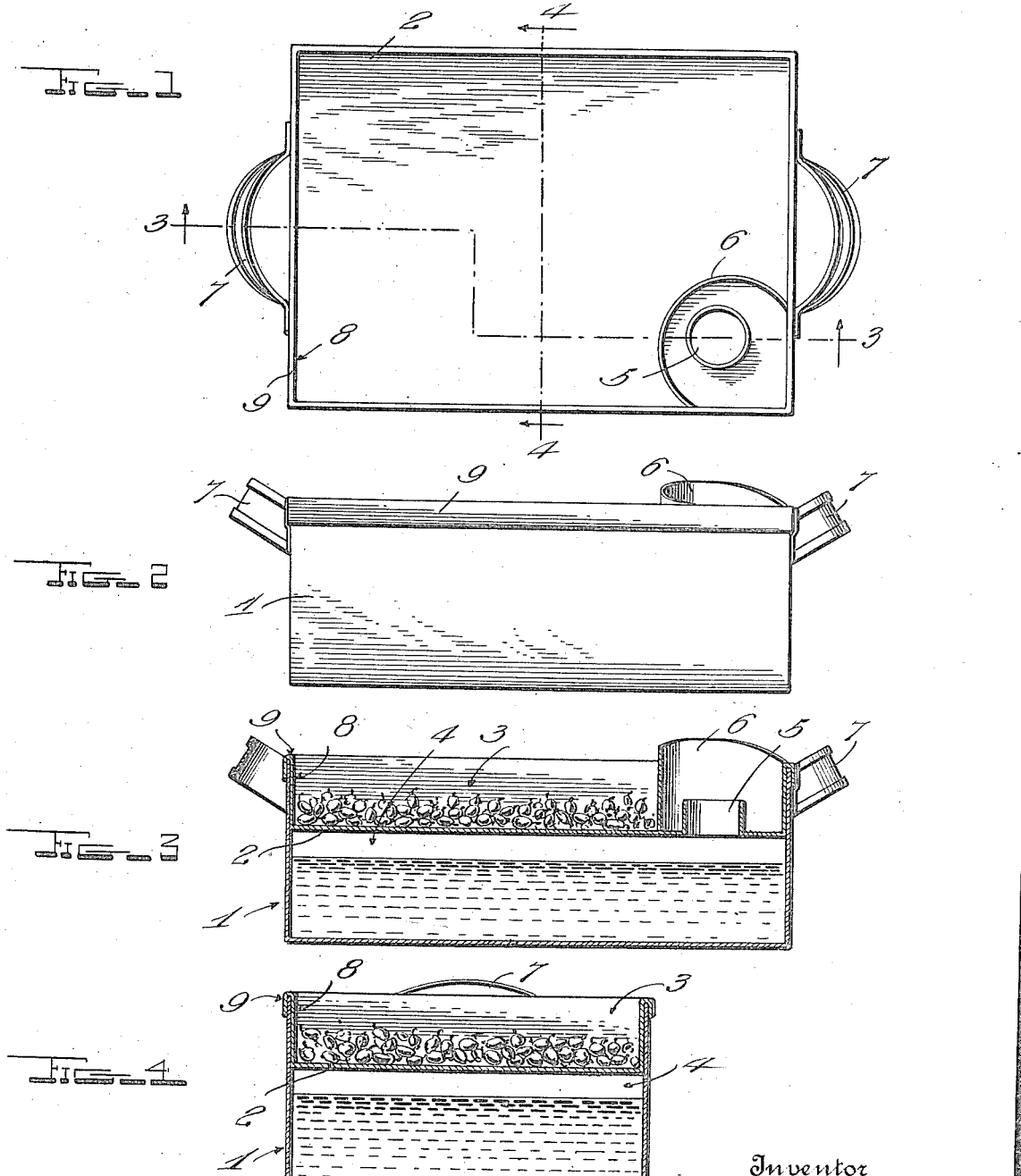

MICHAEL ENDRES, OF NEW PHILADELPHIA, OHIO.

FRUIT AND VEGETABLE DRIER.

1,269,412.

Specification of Letters Patent.   Patented June 11, 1918.

Application filed March 11, 1918.   Serial No. 221,791.

*To all whom it may concern:*

Be it known that I, MICHAEL ENDRES, a citizen of the United States, residing at New Philadelphia, in the county of Tuscarawas and State of Ohio, have invented certain new and useful Improvements in Fruit and Vegetable Driers; and I do declare the following to be a full, clear, and exact description of the invention, such as will enable others skilled in the art to which it appertains to make and use the same.

My invention relates to that class of fruit and vegetable driers employing a pan divided by a horizontal partition into an upper compartment for the fruit or vegetables and a lower water boiler, said partition having an inlet through which the boiler is filled. Heretofore, considerable difficulty has been encountered with this type of drying device, due to the fact that the water often boils so violently as to be discharged through the inlet opening into the fruit or vegetables thus greatly interfering with the drying of the latter. The object of my invention is to overcome this difficulty by segregating the inlet from the remainder of the tray by a partition wall extending across one corner of said tray and of greater height than the tray wall, whereby any water discharged from the boiler will overflow said tray wall instead of being discharged into the fruit or vegetables being dried.

With the foregoing object in view, the invention resides in the novel construction and arrangement of parts hereinafter fully described and claimed, the descriptive matter being supplemented by the accompanying drawing which forms part of this specification and in which:

Figure 1 is a top plan view of a fruit drying pan embodying the invention;

Fig. 2 is a side elevation of the pan;

Fig. 3 is a longitudinal section on the plane of the line 3—3 of Fig. 1; and

Fig. 4 is a transverse section on the plane indicated by the line 4—4 of Fig. 1.

In the drawing above briefly described, the numeral 1 designates a metal pan which is preferably though not necessarily of rectangular formation, said pan being divided by a horizontal partition 2 into an upper tray 3 for the vegetables or fruit, and a lower water boiler 4, said partition having a water inlet 5 at one corner of the tray by means of which the boiler is filled with water.

Passing across the aforesaid corner of the tray is a preferably curved partition wall 6 which segregates the water inlet 5 from the remainder of the tray, said partition wall being of greater height than the tray wall as shown clearly in Figs. 2 and 3. By this arrangement, any water discharged through the inlet 5 by violent boiling in the boiler 4, will either return to said boiler or overflow the tray wall rather than the partition wall 6, thus preventing the drying operation from being in any manner interfered with.

In operation, the fruit or vegetables to be dried are placed in a tray 3 and the boiler is supplied with a suitable quantity of water, the device being then set upon a stove or the like. If desired, a suitable closure may be placed over the inlet 5 until boiling of the water takes place, but should then be removed. By the boiling water, the fruit or vegetables are effectively heated and dried without burning and even though the water boils over from the inlet 5, no injury will be done to the fruit.

In most cases I prefer to equip the pan with a pair of handles 7 and to secure the horizontal partition 2 in place in the manner shown in Figs. 3 and 4, that is by forming a wall 8 on said partition and bending this wall downwardly around the edge of the pan wall at 9, suitably soldering or otherwise securing them together. Such details however do not affect the principal features of the invention and it is to be understood that within the scope of the appended claim, considerable latitude is allowed for the manufacture of the device as occasion may dictate.

I claim:

A vegetable and fruit drier comprising a pan divided by a horizontal partition into an upper fruit or vegetable tray and a lower water boiler, said partition having at one corner of said tray an opening for filling said boiler, and a partition wall extending across said corner of the tray and segregating said opening from the remainder of the tray, said wall being of greater height than the tray wall, whereby boiling water discharged through said opening from the boiler will overflow the tray wall rather than said partition wall and will not therefore dampen the contents of the tray.

In testimony whereof I have hereunto set my hand in the presence of two subscribing witnesses.

MICHAEL ENDRES.

Witnesses:
CLARENCE W. FERRELL,
CHARLES P. ZELLNER.

Copies of this patent may be obtained for five cents each, by addressing the "Commissioner of Patents, Washington, D. C."